United States Patent
Aihara et al.

(10) Patent No.: US 8,988,067 B2
(45) Date of Patent: Mar. 24, 2015

(54) VARIABLE RELUCTANCE RESOLVER AND METHOD OF PRODUCING THE VARIABLE RELUCTANCE RESOLVER

(75) Inventors: Hiroshi Aihara, Toyota (JP); Yasuhiro Endo, Toyota (JP); Toshihiro Kimura, Obu (JP); Yuji Sekitomi, Anjo (JP); Masao Okumura, Chiry (JP); Yuki Yamakawa, Miyoshi (JP); Noriharu Ogiso, Toyota (JP)

(73) Assignees: Toyota Jidosha Kabushiki Kaisha, Toyota-shi (JP); Matsuo Industries, Inc., Obu (JP)

( * ) Notice: Subject to any disclaimer, the term of this patent is extended or adjusted under 35 U.S.C. 154(b) by 564 days.

(21) Appl. No.: 13/104,123

(22) Filed: May 10, 2011

(65) Prior Publication Data
US 2011/0279112 A1 Nov. 17, 2011

(30) Foreign Application Priority Data
May 13, 2010 (JP) ................................. 2010-111344

(51) Int. Cl.
*G01B 7/30* (2006.01)
*H02K 24/00* (2006.01)

(52) U.S. Cl.
CPC ........... *H02K 24/00* (2013.01); *Y10T 29/49071* (2015.01)
USPC ..................................... 324/207.25; 324/263

(58) Field of Classification Search
CPC ............................... H02K 24/00; H02K 27/02
USPC .................................................. 324/207.25
See application file for complete search history.

(56) References Cited

U.S. PATENT DOCUMENTS

| | | | | |
|---|---|---|---|---|
| 2,882,516 A | * | 4/1959 | De Neergaard | 360/110 |
| 7,005,771 B2 | * | 2/2006 | Kobayashi | 310/168 |
| 7,663,283 B2 | * | 2/2010 | Holtzapple et al. | 310/168 |
| 7,868,504 B2 | | 1/2011 | Kataoka et al. | |
| 2006/0043815 A1 | * | 3/2006 | Miya et al. | 310/216 |
| 2009/0033320 A1 | * | 2/2009 | Kikuchi et al. | 324/207.25 |
| 2009/0108836 A1 | * | 4/2009 | Nakamura | 324/207.17 |
| 2013/0060518 A1 | * | 3/2013 | Nakazato | 702/151 |

FOREIGN PATENT DOCUMENTS

| | | |
|---|---|---|
| JP | 07006709 U | 1/1995 |
| JP | 2008268065 | 11/2008 |

OTHER PUBLICATIONS

JPO Machine Translation, JP1995-006709, p. 1-6, 2013.*

* cited by examiner

*Primary Examiner* — Thomas F Valone
(74) *Attorney, Agent, or Firm* — Gifford, Krass, Sprinkle, Anderson & Citkowski, P.C.

(57) ABSTRACT

A variable reluctance resolver includes a rotor that rotates about a rotational axis, a plurality of detection coils that detect rotation of the rotor, and a magnetic member that magnetically connects adjacent ones of the detection coils to each other. The magnetic member includes a pair of body portions around which the detection coils are wound, and a connection portion that connects the pair of body portions to each other. Both the body portions and the connection portion have a thin flat shape. The body portions are flat so that a direction of extension of the flat shape is along a rotational axis direction, and the magnetic member has a U shape as viewed from the rotational axis direction.

12 Claims, 13 Drawing Sheets

COMPARATIVE EXAMPLE

VARIABLE RELUCTANCE RESOLVER AND METHOD OF PRODUCING THE VARIABLE RELUCTANCE RESOLVER

CROSS-REFERENCE TO RELATED APPLICATIONS

This application claims priority to Japanese Patent Application No. 2010-111344 filed on May 13, 2010, which is incorporated herein by reference in its entirety including the specification, drawings and abstract.

BACKGROUND OF THE INVENTION

1. Field of the Invention

The present invention relates to a variable reluctance resolver, and more specifically to a variable reluctance resolver that detects rotation of a motor.

2. Description of the Related Art

The structure of a resolver according to the related art is disclosed in Japanese Utility Model Application Publication No. 7-6709 (JP-U-7-6709) and Japanese Patent Application Publication No. 2008-268065 (JP-A-2008-268065), for example.

In the related art, a variable reluctance resolver that has a core that has a U shape with respect to the axial direction is disclosed. However, the variable reluctance resolver according to the related art has a large physical size.

SUMMARY OF THE INVENTION

In view of the above, the present invention provides a variable reluctance resolver that can be downsized and a production method of the variable reluctance resolver.

A first aspect of the present invention provides a variable reluctance resolver including: a rotor that rotates about a rotational axis; a plurality of detection coils that detect rotation of the rotor; and a magnetic member that magnetically connects adjacent ones of the detection coils to each other, in which the magnetic member includes a pair of body portions around which the detection coils are wound, and a connection portion that connects the pair of body portions to each other, both the body portions and the connection portion have a thin flat shape, and the body portions are flat so that a direction of extension of the flat shape is along a rotational axis direction, and the magnetic member has a U shape as viewed from the rotational axis direction.

According to the variable reluctance resolver of the above first aspect, the magnetic member has a thin flat shape, which can downsize the magnetic member and hence the entire variable reluctance resolver.

A second aspect of the present invention provides a method of producing the variable reluctance resolver according to the above aspect, including: processing a plate material made of a magnetic element to form an outer magnetic element and a plurality of U-shaped magnetic members that are provided on an inner circumferential side of the outer magnetic element; bending the magnetic members around a boundary between body portions and a connection portion to deform the magnetic members such that the body portions have a flat shape so that a direction of extension of the flat shape is along a rotational axis direction; winding coils around the body portions; and removing a portion of the outer magnetic element to suppress passage of magnetic flux between the magnetic members around which the coils are wound.

According to the production method of the above second aspect, a plurality of magnetic members can be produced at a time.

A third aspect of the present invention provides a variable reluctance resolver including: a rotor that rotates about a rotational axis; a plurality of detection coils that detect rotation of the rotor; and a U-shaped magnetic member that magnetically connects adjacent ones of the detection coils to each other, in which the magnetic member includes a pair of body portions around which the detection coils are wound, a connection portion that connects first ends of the pair of body portions to each other, and distal end portions that are provided at second ends of the pair of body portions that are opposite the first ends to extend in a rotational axis direction, the distal end portions, the body portions, and the connection portion have a wire shape, and the magnetic member has a U shape as viewed from the rotational axis direction.

According to the variable reluctance resolver of the above third aspect, the magnetic member has a wire shape, which can downsize the magnetic member and hence the entire variable reluctance resolver.

According to the above aspects, a variable reluctance resolver that can be downsized and a production method of the variable reluctance resolver can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of the present invention will be described hereinafter with reference to the drawings. The same or equivalent portions of the following embodiments are denoted by the same reference numerals, and are not described repeatedly. The embodiments may be combined with each other.

First Embodiment

Figure 1:
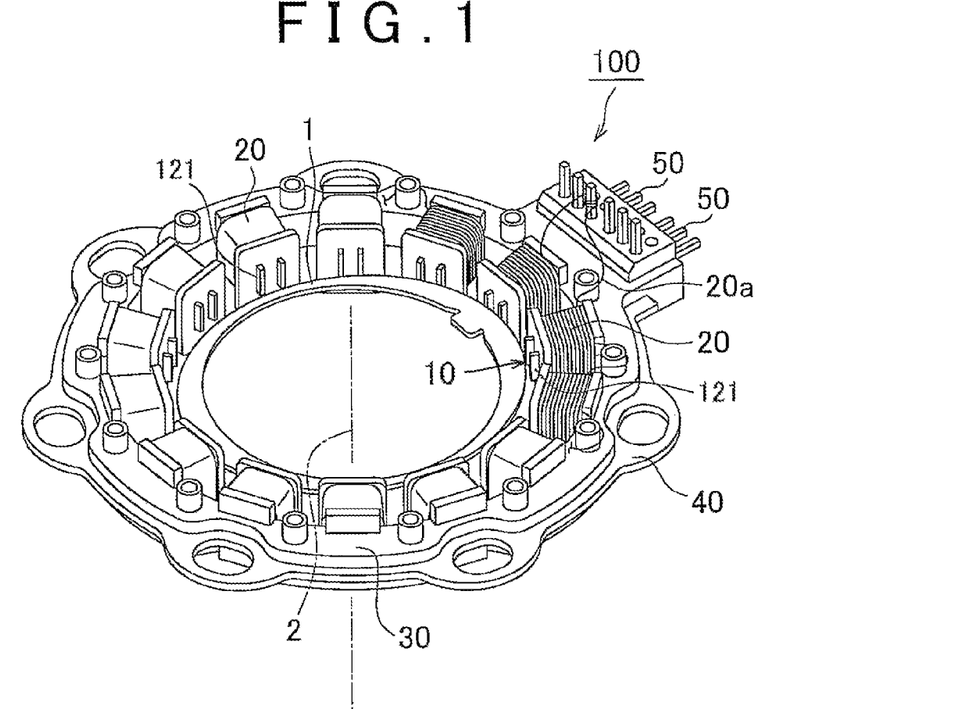
FIG. 1 is a perspective view of a variable reluctance resolver according to a first embodiment of the present invention.

FIG. 1 is a perspective view of a variable reluctance resolver according to a first embodiment of the present invention. As shown in FIG. 1, a variable reluctance resolver 100 includes a rotor 1 that rotates about a rotational axis 2. A plurality of detection coils 20 that detect rotation of the rotor 1 are disposed around the outer circumference of the rotor 1. Magnetic members 10 magnetically connect adjacent ones of the detection coils 20 to each other. The detection coils 20 and the magnetic members 10 are molded with a resin 30. The resin 30 for molding is fitted with a mounting plate 40. This allows the resin 30, the detection coils 20, and the magnetic members 10 to be fixed to the mounting plate 40. The detection coils 20 are connected to terminals 50, and thus can receive and output an electric signal from and to the outside via the terminals 50. The detection coils 20 are formed by winding a conductor wire 20a.

Figure 2:
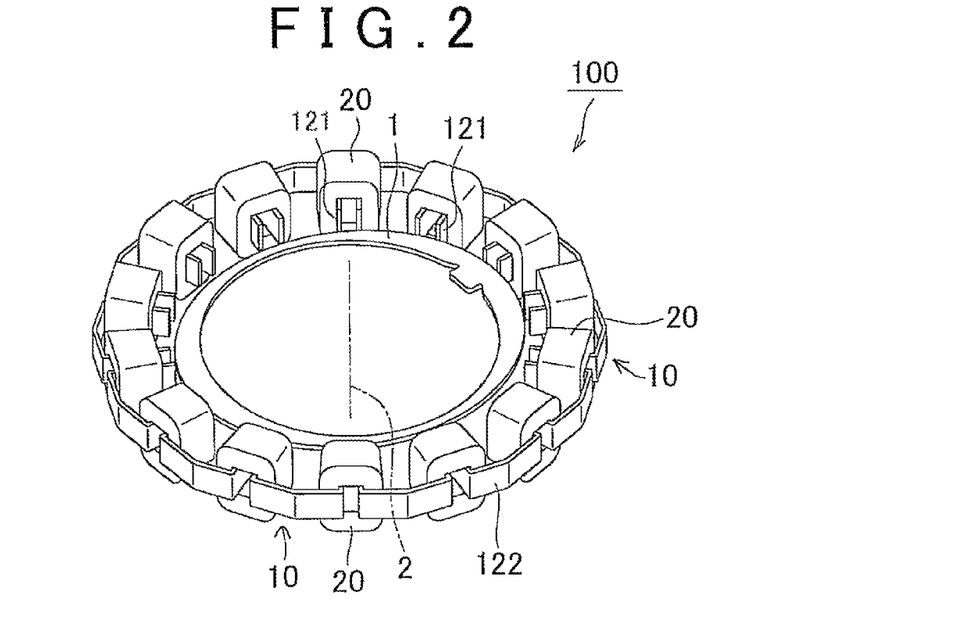
FIG. 2 is a perspective view of the variable reluctance resolver which is shown in FIG. 1 and from which a mounting plate and a resin have been removed.

FIG. 2 is a perspective view of the variable reluctance resolver which is shown in FIG. 1 and from which the mounting plate and the resin have been removed. As shown in FIG. 2, the magnetic members 10 connect the plurality of detection coils 20 which are disposed on a circumference. Portions of each of the magnetic members 10 are inserted into the detection coils 20, and the other portion of each of the magnetic members 10 connects the adjacent detection coils 20 to each other. The number of the detection coils 20 may be larger or smaller than the number of the detection coils 20 which are shown in the example.

Figure 3:
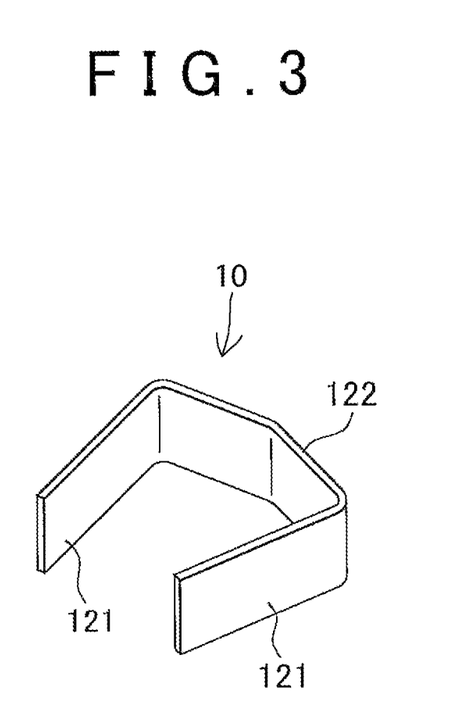
FIG. 3 is a perspective view of a magnetic member that magnetically connects adjacent detection coils according to the first embodiment.

FIG. 3 is a perspective view of the magnetic member that magnetically connects adjacent ones of the detection coils according to the first embodiment. As shown in FIG. 3, the magnetic member 10 includes a pair of body portions 121 around which detection coils are to be wound, and a connection portion 122 that connects the body portions 121 to each other. The magnetic member 10 is formed by bending a thin plate, and has a flat shape. The magnetic member 10 is formed from a plate made of a magnetic material such as an electromagnetic steel plate (silicon steel plate).

Figure 4:
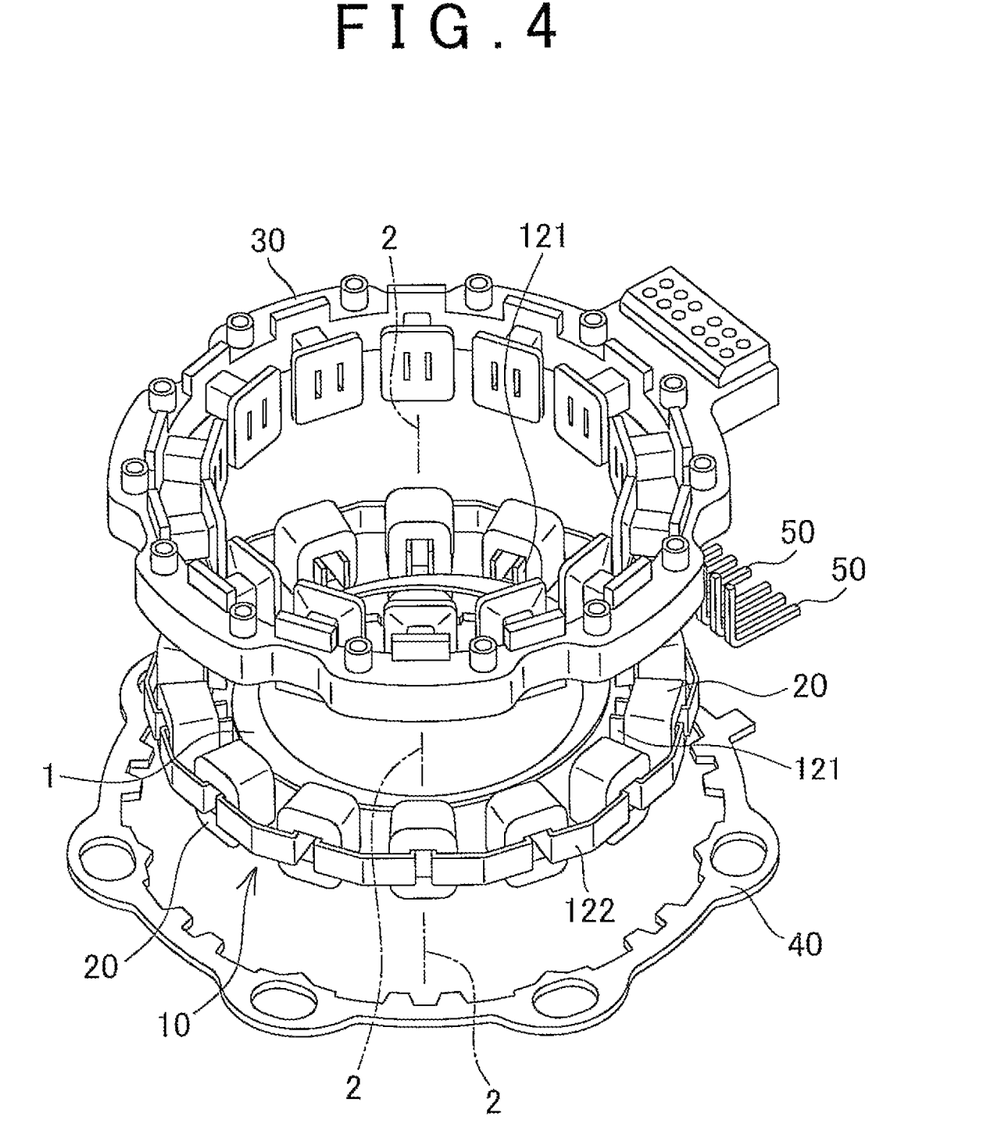
FIG. 4 is a perspective view that shows various components of the variable reluctance resolver according to the first embodiment.

FIG. 4 is a perspective view that shows various components of the variable reluctance resolver according to the first embodiment. As shown in FIG. 4, the detection coils 20 and the magnetic members 10 are disposed on the inner circumferential side of the mounting plate 40. In this state, the detection coils 20 and the magnetic members 10 are molded on the mounting plate 40 with the resin 30. The resolver can be produced in this way.

Alternatively, the magnetic members 10, the terminals 50, and the mounting plate 40 may be molded with the resin 30 to produce a molded product, bobbin portions may be formed around the body portions 121 with the resin 30, and the detection coils 20 may be wound around the bobbin portions to form the resolver 100.

Figure 5:
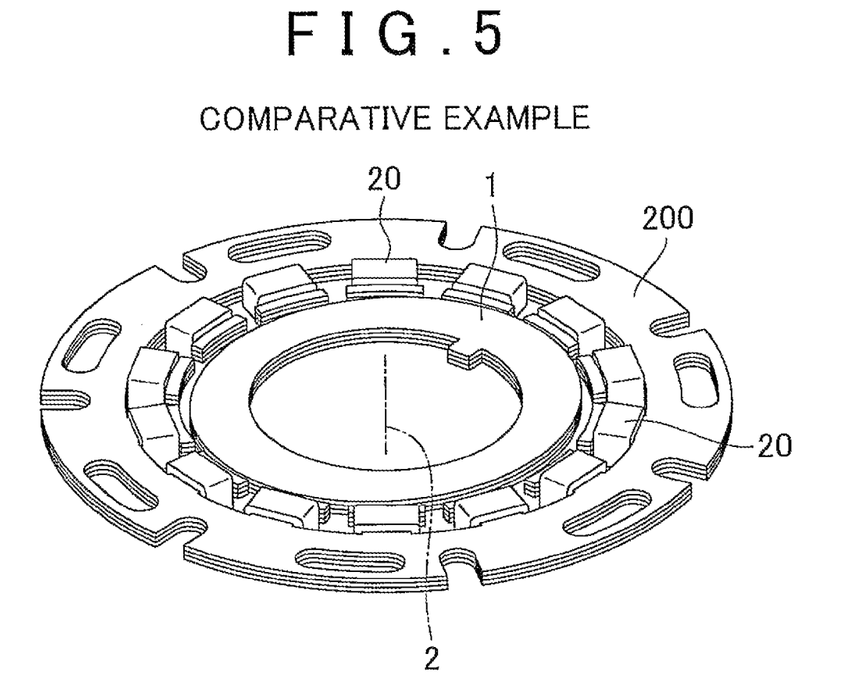
FIG. 5 shows a resolver according to a comparative example.

FIG. 5 shows a resolver according to a comparative example. In the resolver according to the comparative example, a stator core 200 and the rotor 1 each have a laminated structure, and product mounting holes are formed in the stator core 200, which increases the product size and weight. In addition, an electromagnetic steel plate (silicon steel plate) is generally used as a material with excellent magnetic characteristics, which leads to a high product cost. In the resolver according to the first embodiment which is shown in FIGS. 1 to 4, in contrast, the stator and the core each have a single layer structure. Further, the weight of the resolver is reduced by approximately 50% compared to the resolver according to the comparative example which is shown in FIG. 5, which reduces the amount of electromagnetic steel that is used. Therefore, an inexpensive resolver can be provided.

As a result of performing an electromagnetic field analysis on the resolver according to the comparative example which is shown in FIG. 5, it was found that in the structure according to the comparative example, most magnetic flux concentrated on a surface portion because of the skin effect. The resolver according to the first embodiment which is shown in FIGS. 1 to 4 is obtained by removing most of a portion other than the portion on which magnetic flux concentrated on. That is, the resolver according to the first embodiment includes the rotor 1 which rotates about the rotational axis 2, the plurality of detection coils 20 which detect rotation of the rotor 1, and the U-shaped magnetic member 10 which magnetically connects adjacent ones of the detection coils 20 to each other. The magnetic member 10 includes the pair of body portions 121 around which the detection coils 20 are wound, and the connection portion 122 which connects the pair of body portions 121 to each other. Both the body portions 121 and the connection portion 122 have a thin flat shape. The body portions 121 are flat so that a direction of extension of the flat shape is along a rotational axis direction, and the magnetic member 10 has a U shape as viewed from the rotational axis direction.

Second Embodiment

Figure 6:
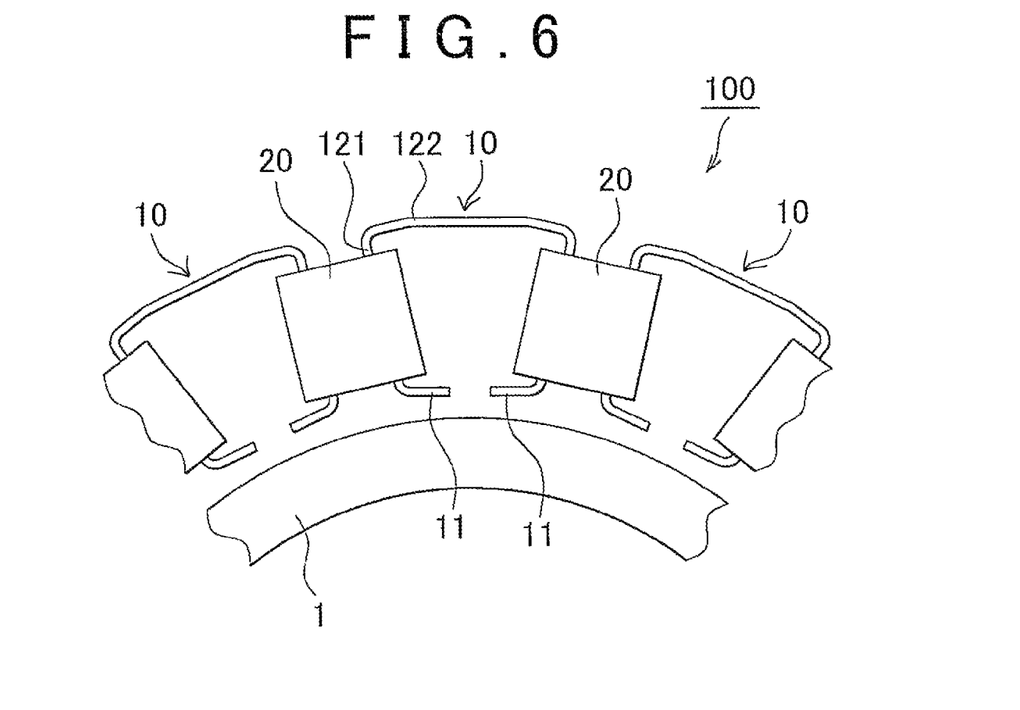
FIG. 6 is a plan view that illustrates the structure of a magnetic member in a variable reluctance resolver according to a second embodiment of the present invention.

FIG. 6 is a plan view that illustrates the structure of a magnetic member in a variable reluctance resolver according to a second embodiment of the present invention. As shown in FIG. 6, the resolver according to the second embodiment is different from the resolver according to the first embodiment in that the distal ends of the body portions 121 of the magnetic member 10 project radially inward toward the rotor 1 from the detection coils 20, which are formed on the body portions 121, and extend in the circumferential direction of the rotor 1. Distal end portions 11 of the body portions 121 extend in the circumferential direction of the rotor 1 so as to approach each other. This increases the area over which the distal end portions 11 and the rotor 1 face each other. That is, the distal end portions 11 serve as extensions. This improves the voltage transformation ratio.

Figure 7:
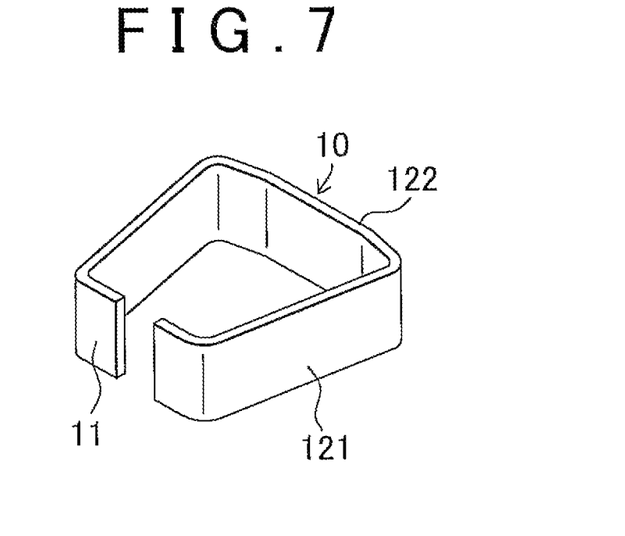
FIG. 7 is a perspective view of the magnetic member which is used in the variable reluctance resolver which is shown in FIG. 6.
Figure 8:
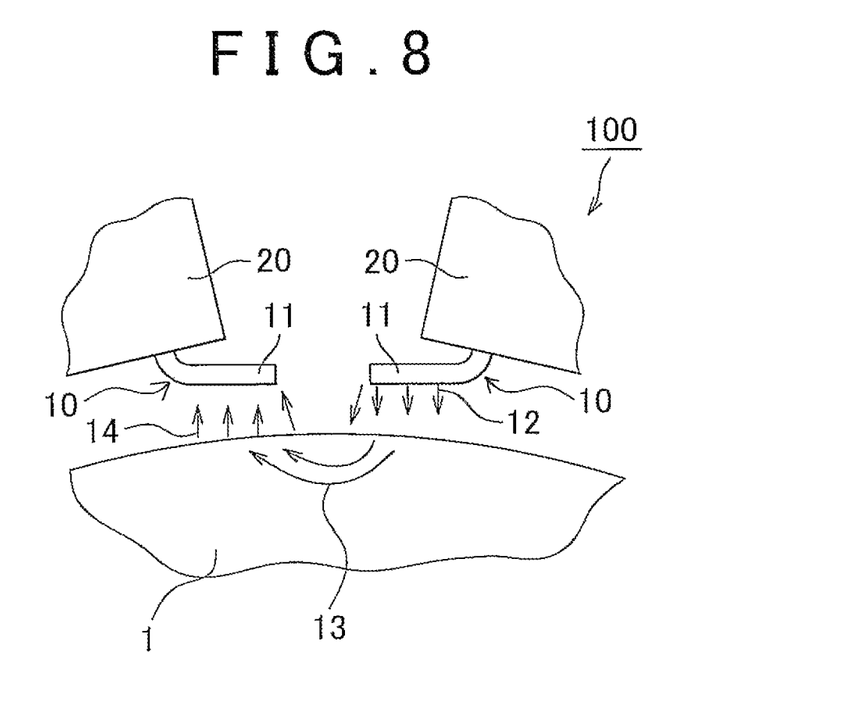
FIG. 8 shows the flow of magnetic flux in the magnetic member according to the second embodiment which is shown in FIGS. 6 and 7.

FIG. 7 is a perspective view of the magnetic member which is used in the variable reluctance resolver which is shown in FIG. 6. FIG. 8 shows the flow of magnetic flux in the magnetic member according to the second embodiment which is shown in FIGS. 6 and 7. As shown in FIGS. 7 and 8, the distal end portions 11 of the body portions 121 extend in the circumferential direction of the rotor 1. Magnetic flux flows in the direction indicated by the arrow 12, passes inside the rotor 1 in the direction indicated by the arrow 13, and further flows in the direction indicated by the arrow 14. Since the area over which the distal end portions 11 and the rotor 1 face each other is increased, magnetic flux can be received over a wider area, which suppresses leakage of magnetic flux.

That is, in the structure according to the second embodiment, the distal end portions 11 of the body portions 121 extend in the circumferential direction of the rotor 1 so as to approach each other.

Third Embodiment

Figure 9:
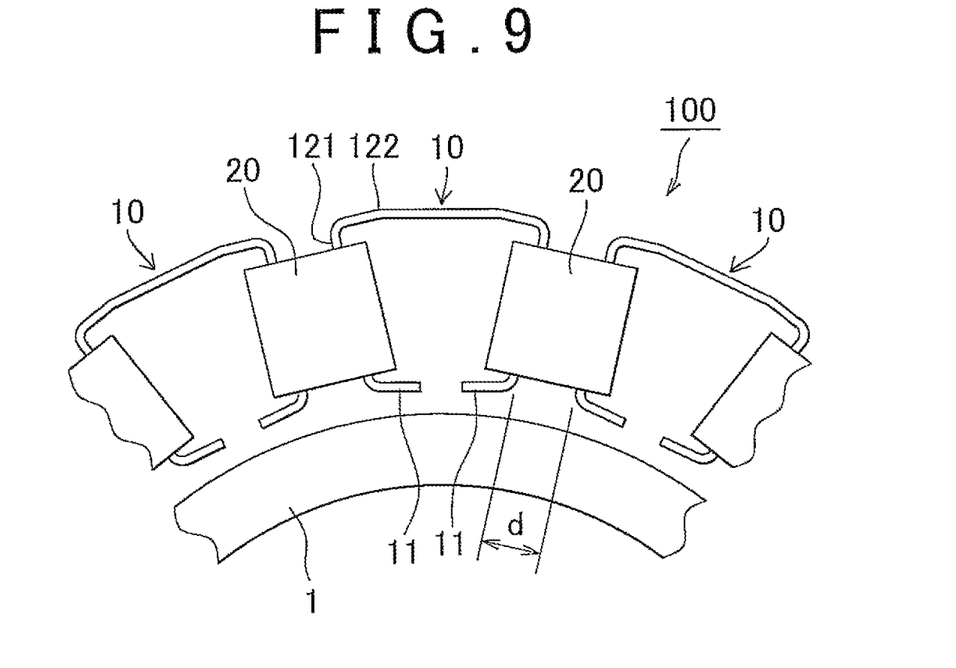
FIG. 9 is a plan view that illustrates the structure of a magnetic member in a variable reluctance resolver according to a third embodiment of the present invention.

FIG. 9 is a plan view that illustrates the structure of a magnetic member in a variable reluctance resolver according to a third embodiment of the present invention. As shown in FIG. 9, in the variable reluctance resolver 100 according to the third embodiment of the present invention, the distance "d" between adjacent ones of the magnetic members 10 is smaller than that in the first embodiment. This reduces the impedance of the coils and improves the voltage transformation ratio. In the case where the number of turns, the material, and the wire shape of the coils are equivalent to the reference, as the distance "d" is smaller, the overall size of the coils is also reduced, as a result of which the impedance of the coils is reduced.

Fourth Embodiment

Figure 10:
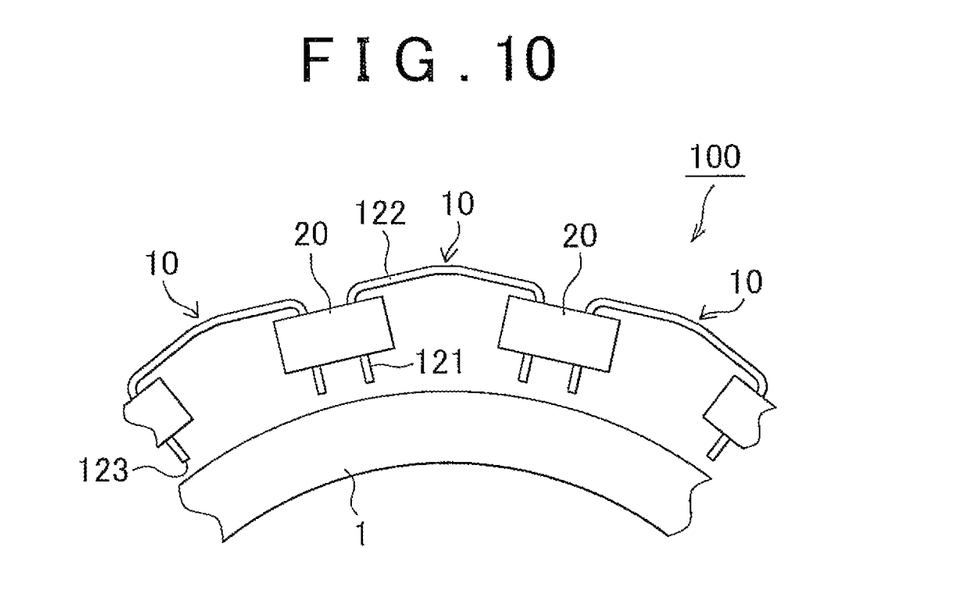
FIG. 10 is a plan view that illustrates the structure of a magnetic member in a variable reluctance resolver according to a fourth embodiment of the present invention.
Figure 11:
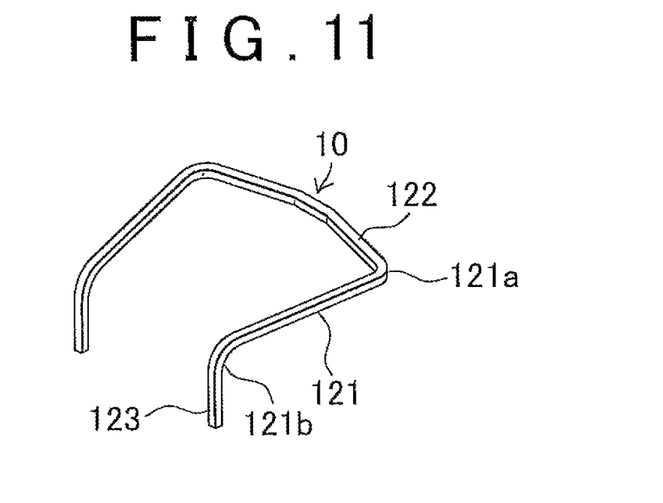
FIG. 11 is a perspective view of the magnetic member which is used in the variable reluctance resolver which is shown in FIG. 10.

FIG. 10 is a plan view that illustrates the structure of a magnetic member in a variable reluctance resolver according to a fourth embodiment of the present invention. FIG. 11 is a perspective view of the magnetic member which is used in the variable reluctance resolver which is shown in FIG. 10. As shown in FIGS. 10 and 11, the resolver according to the fourth embodiment is provided with the magnetic members 10 which serve as cores that are shaped from a wire material. The cross-sectional shape of the wire material may be a round shape, a rectangular shape, or any other shape. The magnetic member 10 includes a pair of body portions 121, a connection portion 122 that is connected to first ends 121a of the body portions 121, and distal end portions 123 that are provided at second ends 121b of the body portions 121 that are opposite the first ends 121a. The distal end portions 123 extend in the rotational axis direction, which enables the distal end portions 123 to be engaged with the detection coils 20. While both the distal end portions 123 extend downward in FIG. 11, one of the distal end portions 123 may extend downward and the other one of the distal end portions 123 may extend upward.

Figure 12:
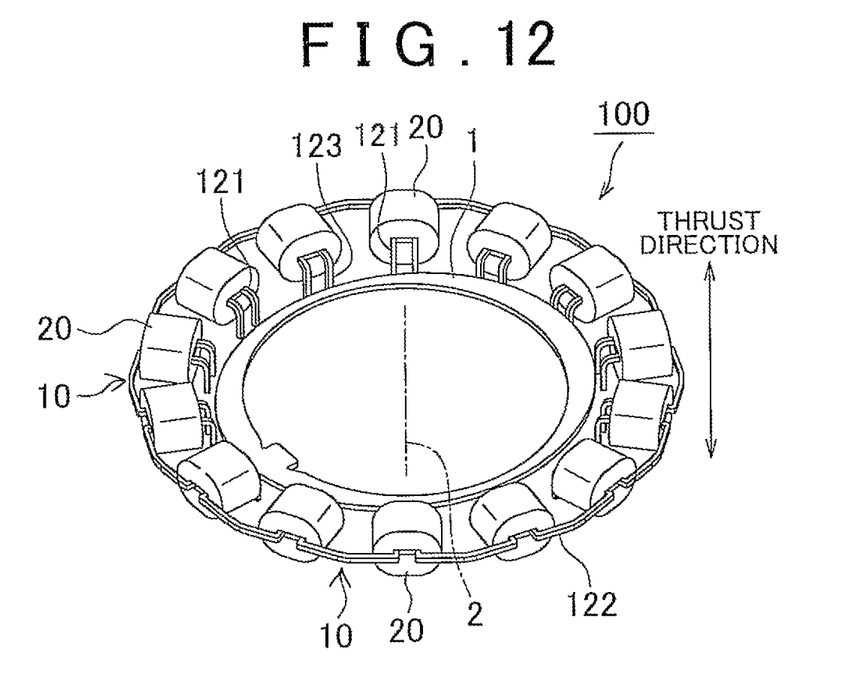
FIG. 12 shows the effect of the variable reluctance resolver according to the fourth embodiment of the present invention.

FIG. 12 shows the effect of the variable reluctance resolver according to the fourth embodiment of the present invention. As shown in FIG. 12, according to the resolver of the fourth embodiment, the magnetic members 10 have a wire shape, and therefore an error in accuracy in the thrust direction may be suppressed. That is, even if the detection coils 20 are moved in the thrust direction, the magnetic members 10 can absorb such movement.

That is, the variable reluctance resolver 100 according to the fourth embodiment includes the rotor 1 which rotates about the rotational axis 2, the plurality of detection coils 20 which detect rotation of the rotor 1, and the magnetic member 10 which magnetically connects adjacent ones of the detection coils 20 to each other. The magnetic member 10 includes the pair of body portions 121 around which the detection coils 20 are wound, the connection portion 122 which connects the first ends 121a of the pair of body portions 121 to each other, and the distal end portions 123 which are provided at the second ends 121b of the body portions 121 that are opposite the first ends 121a to extend in the rotational axis direction. The distal end portions 123, the body portions 121, and the connection portion 122 have a wire shape, and the magnetic member 10 has a U shape as viewed from the rotational axis direction.

Fifth Embodiment

Figure 13:
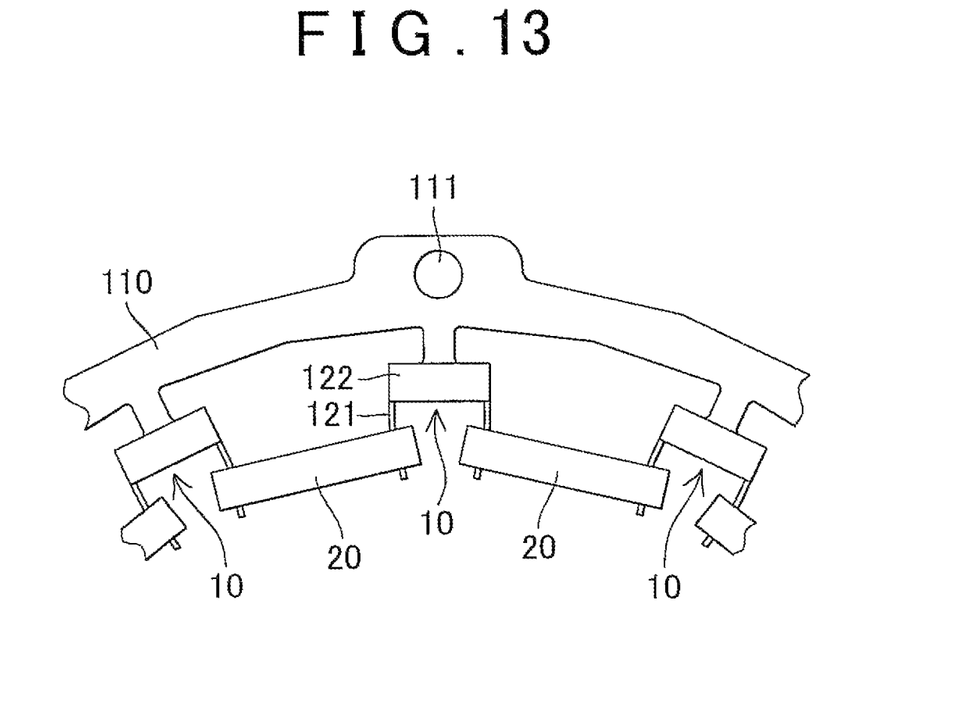
FIG. 13 is a plan view that illustrates the structure of a magnetic member in a variable reluctance resolver according to a fifth embodiment of the present invention.

FIG. 13 is a plan view that illustrates the structure of a magnetic member in a variable reluctance resolver according to a fifth embodiment of the present invention. As shown in FIG. 13, in the variable reluctance resolver according to the fifth embodiment, an outer magnetic element 110 that is an annular member is provided with a plurality of magnetic members 10. The outer magnetic element 110 is provided with an engagement portion 111 that is a mounting hole (product mounting hole) for a support member. In FIG. 13, the plurality of magnetic members 10 are connected by the outer magnetic element 110. In order for the resolver to perform its function, portions of the outer magnetic element 110 are to be removed to suppress passage of magnetic flux between adjacent ones of the magnetic members 10.

Figure 14:
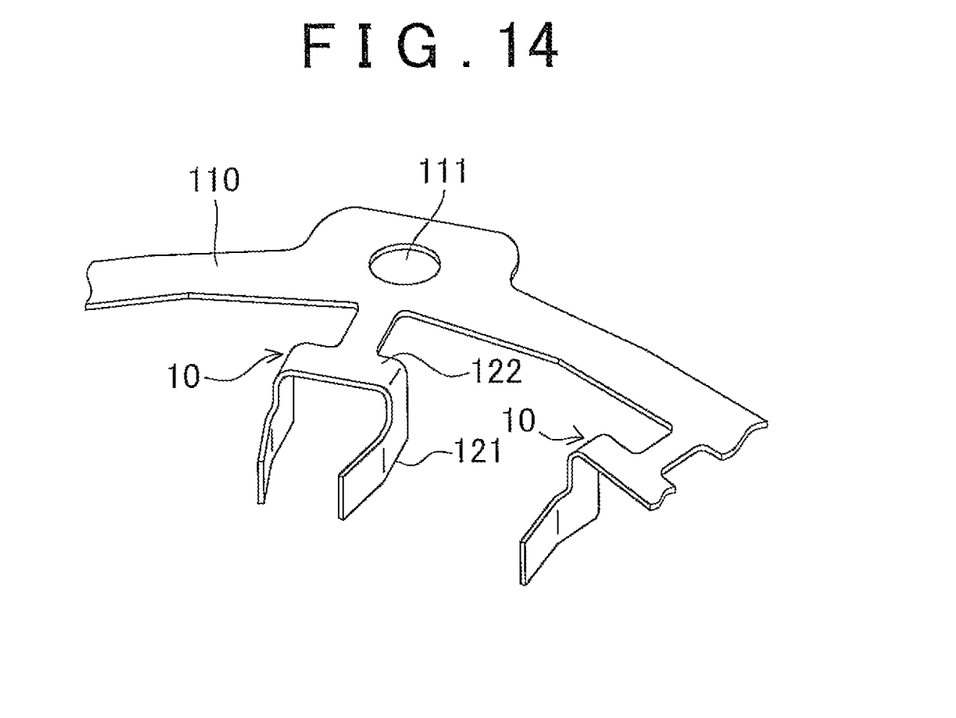
FIG. 14 is a perspective view that shows the magnetic member which is shown in FIG. 13 and from which detection coils have been removed.

The detection coils 20 are wound around the body portions 121 of the magnetic members 10. FIG. 14 is a perspective view that shows the magnetic member which is shown in FIG. 13 and from which the detection coils have been removed. As shown in FIG. 14, the magnetic member 10 includes a pair of body portions 121 that extend in the radial direction of the rotational axis 2, and a connection portion 122 that connects the pair of body portions 121 to each other. The connection portion 122 is connected to the outer magnetic element 110. The outer magnetic element 110 may be, or may not be, provided with the engagement portion 111 which has a hole shape.

The outer magnetic element 110 and the magnetic member 10 may be formed by pressing a thin plate, for example.

Figure 15:
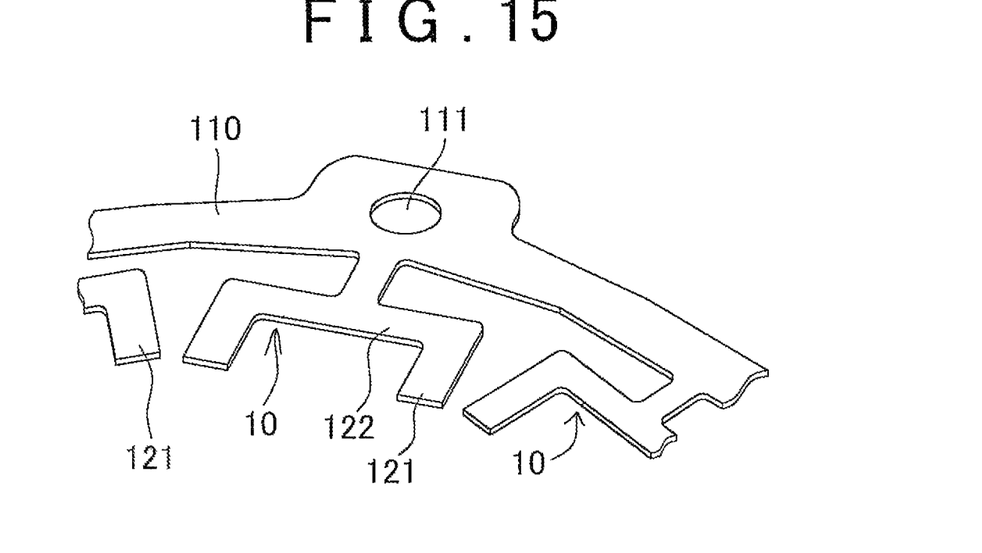
FIG. 15 is a perspective view that shows the magnetic member according to the fifth embodiment of the present invention which is formed on a single plate material made of a magnetic element before being bent.

FIG. 15 is a perspective view that shows the magnetic member which is formed on a single plate material made of a magnetic element before being bent. The magnetic member 10 and the outer magnetic element 110, which are formed by punching a plate material, are formed from a thin magnetic plate. The body portions 121 and the connection portion 122 are formed from a plate member of the same thickness. The magnetic member 10 which is shaped as shown in FIG. 14 may be formed by bending portions of the plate material.

Figure 16:
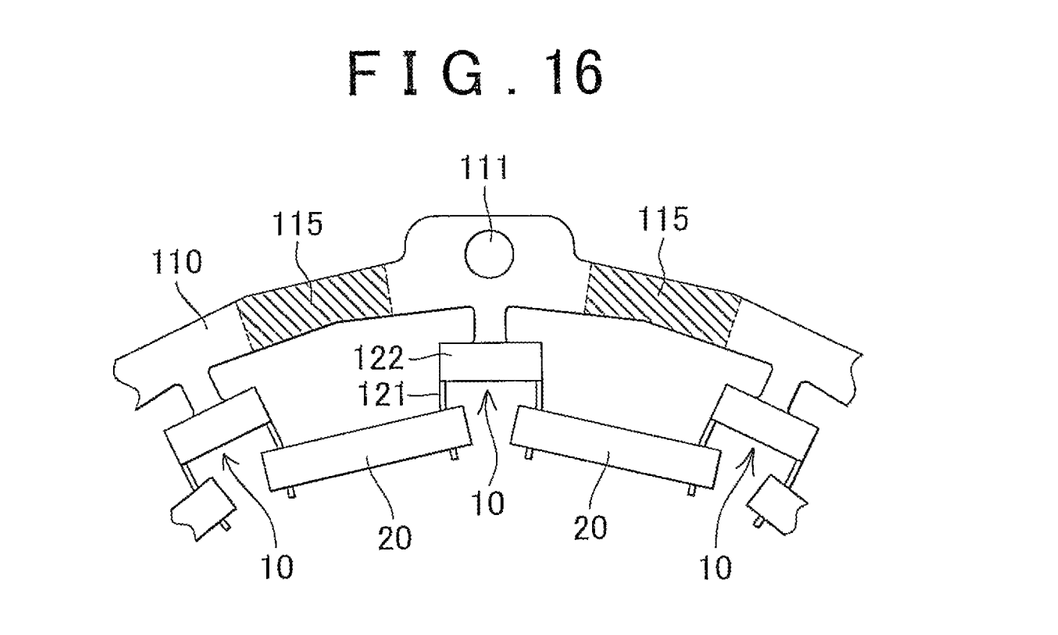
FIG. 16 shows portions of an outer circumferential magnetic element to be cut away to suppress passage of magnetic flux between adjacent magnetic members according to the fifth embodiment of the present invention.

FIG. 16 shows portions of the outer circumferential magnetic element to be cut away to suppress passage of magnetic flux between adjacent ones of the magnetic members. As shown in FIG. 16, if the outer magnetic element 110 is annular, the outer magnetic element 110 magnetically connects adjacent ones of the magnetic members 10 to each other. This produces a magnetic flux loop other than the magnetic flux loop which is intended to be produced on the magnetic circuit via the rotor. In order to avoid such a situation, portions 115 indicated by the hatched areas are removed such that the magnetic members 10 are independent of each other.

That is, a method of producing the variable reluctance resolver according to the fifth embodiment includes: processing a plate material made of a magnetic element to form an annular outer magnetic element 110 and a plurality of U-shaped magnetic members 10 that are provided on an inner circumferential side of the outer magnetic element 110; bending the magnetic members 10 around a boundary between body portions 121 and a connection portion 122 to deform the magnetic members 10 such that the body portions 121 have a flat shape so that a direction of extension of the flat shape is along a rotational axis direction; winding detection coils 20 around the body portions 121; and removing a portion of the outer magnetic element 110 to securely block a magnetic path between adjacent ones of the magnetic members 10 around which the detection coils 20 are wound.

According to the production method of the fifth embodiment, the magnetic members 10 which serve as a stator core are structured integrally, which improves the accuracy in core position and the workability (in setting the magnetic members 10 to a resin mold). In addition, providing the engagement portion 111 which serves as a product mounting hole eliminates the need to provide a dedicated product mounting component.

Sixth Embodiment

Figure 17:
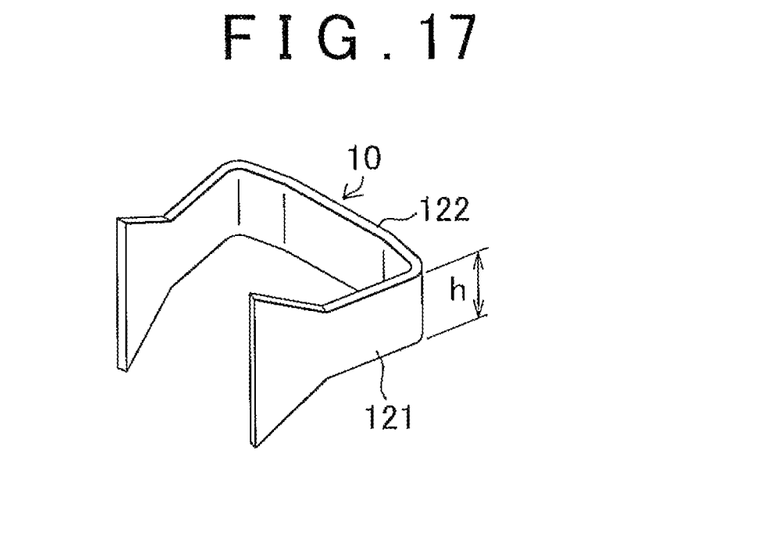
FIG. 17 is a perspective view of a magnetic member which is used in a variable reluctance resolver according to a sixth embodiment of the present invention.

FIG. 17 is a perspective view of a magnetic member which is used in a variable reluctance resolver according to a sixth embodiment of the present invention. As shown in FIG. 17, in the magnetic member 10 which is used in the resolver according to the sixth embodiment of the present invention, the height "h" of the body portions 121 is greater at the distal end portions, and is smaller at the root portions. Reducing the height "h" reduces the impedance of the coils and improves the voltage transformation ratio. In the case where the number of turns, the material, and the wire shape of the coils are equivalent to the reference, as the height "h" is smaller, the overall size of the coils is also reduced, as a result of which the impedance of the coils is reduced.

That is, according to the sixth embodiment, the length of the body portions 121 in the rotational axis direction increases toward the distal ends of the body portions 121.

Seventh Embodiment

Figure 18:
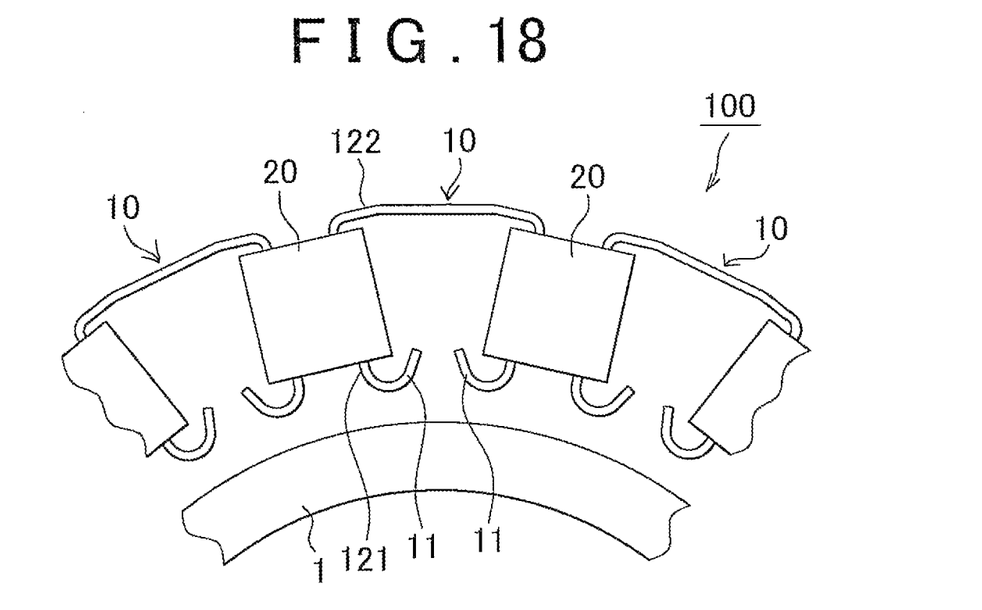
FIG. 18 is a plan view that illustrates the structure of a magnetic member in a variable reluctance resolver according to a seventh embodiment of the present invention.
Figure 19:
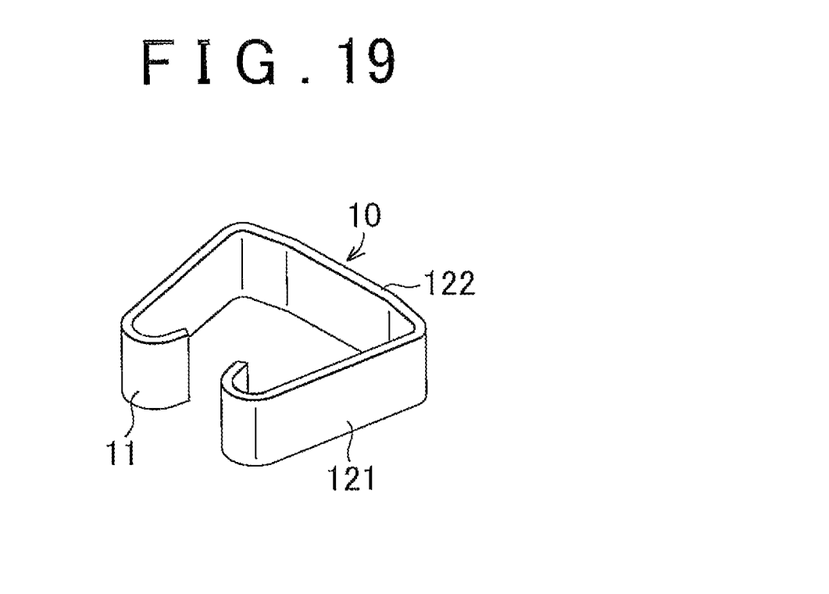
FIG. 19 is a perspective view of the magnetic member which is used in the variable reluctance resolver which is shown in FIG. 18.

FIG. 18 is a plan view that illustrates the structure of a magnetic member in a variable reluctance resolver according to a seventh embodiment of the present invention. FIG. 19 is a perspective view of the magnetic member which is used in the variable reluctance resolver which is shown in FIG. 18. As shown in FIGS. 18 and 19, in the variable reluctance resolver 100 according to the seventh embodiment of the present invention, the distal end portions 11 have a curved shape. This improves the angular accuracy with magnetic flux prevented from looping through a press fracture surface or a shear surface, by adopting a curved shape which involves a small processing stress compared to a press fracture surface or a shear surface. It is known that the magnetic characteristics are deteriorated by an external stress. By forming the distal end portions 11 with a curved shape, it is possible to prevent deterioration of the magnetic characteristics of portions that face the rotor.

Figure 20:
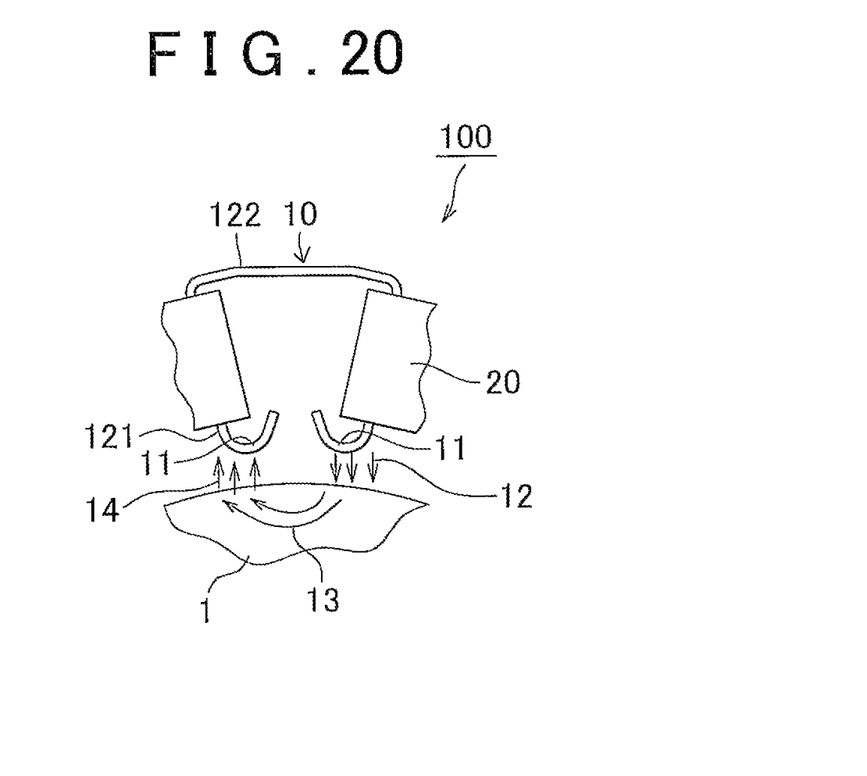
FIG. 20 shows the flow of magnetic flux in the magnetic member according to the seventh embodiment which is shown in FIGS. 18 and 19.

FIG. 20 shows the flow of magnetic flux in the magnetic member according to the seventh embodiment which is shown in FIGS. 18 and 19.

The characteristics of magnetic flux that flows through the distal end portions 11 are shown. That is, magnetic flux flows as indicated by the arrow 12, passes inside the rotor 1 as indicated by the arrow 13, and then flows toward the opposite distal end portion 11 as indicated by the arrow 14.

In the thus configured variable reluctance resolver 100 according to the seventh embodiment, the distal end portions 11 of the pair of body portions 121 are curved to approach each other and to extend radially outward away from the rotor 1.

Eighth Embodiment

Figure 21:
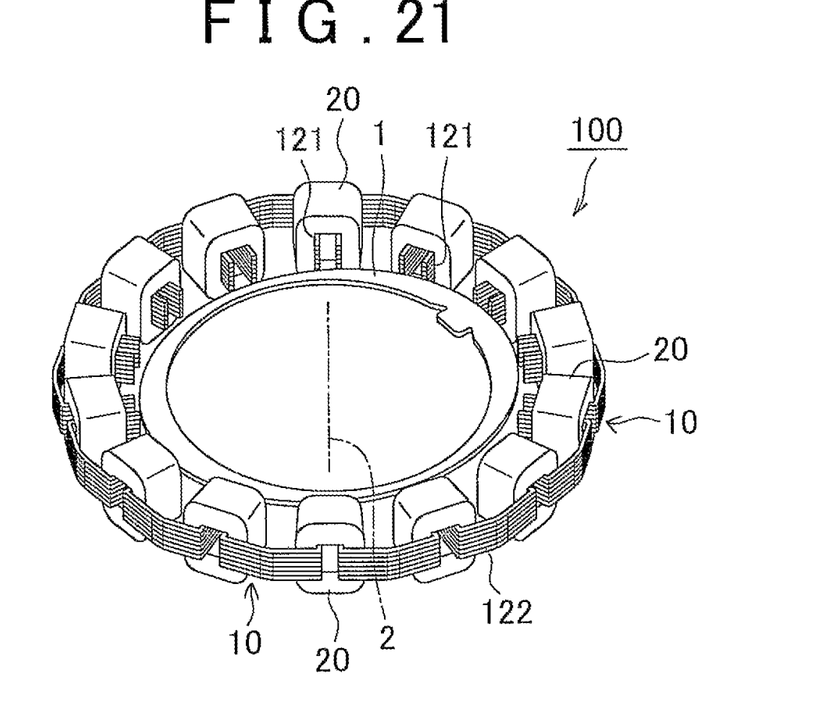
FIG. 21 is a perspective view of a variable reluctance resolver according to an eighth embodiment of the present invention.
Figure 22:
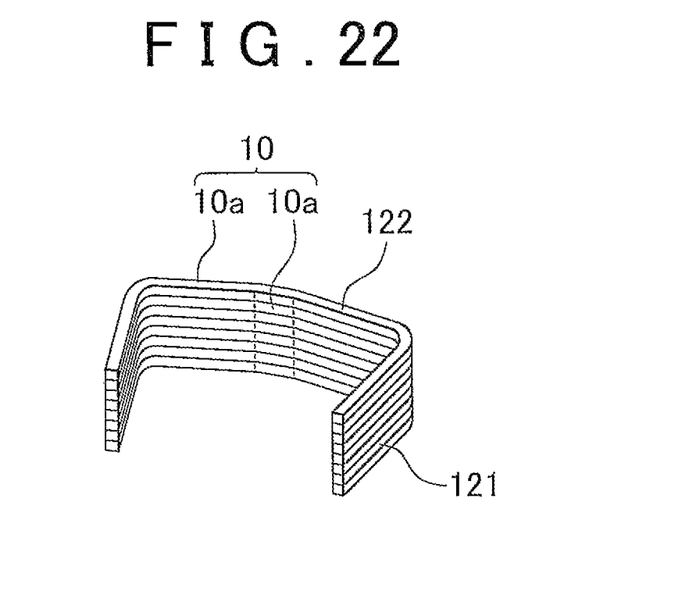
FIG. 22 is a perspective view of a magnetic member which is used in the variable reluctance resolver which is shown in FIG. 21.

FIG. 21 is a perspective view of a variable reluctance resolver according to an eighth embodiment of the present invention. FIG. 22 is a perspective view of a magnetic member which is used in the variable reluctance resolver which is shown in FIG. 21. As shown in FIGS. 21 and 22, in the variable reluctance resolver 100 according to the eighth embodiment of the present invention, the magnetic member 10 is formed by laminating wire materials 10a. The wire material 10a may be a rectangular wire, a round wire, or a wire material of any other shape. This suppresses generation of an eddy current and improves the voltage transformation ratio. The eddy current $P_e$ is represented by the following equation (1):

$$P_e = K_e (tfB_m)^2 / \rho \qquad (1)$$

where $B_m$, represents the maximum magnetic flux density, $k_e$ represents the constant of proportionality, t represents the plate thickness, f represents the frequency, and $\rho$ represents the electric resistivity.

Ninth Embodiment

Figure 23:
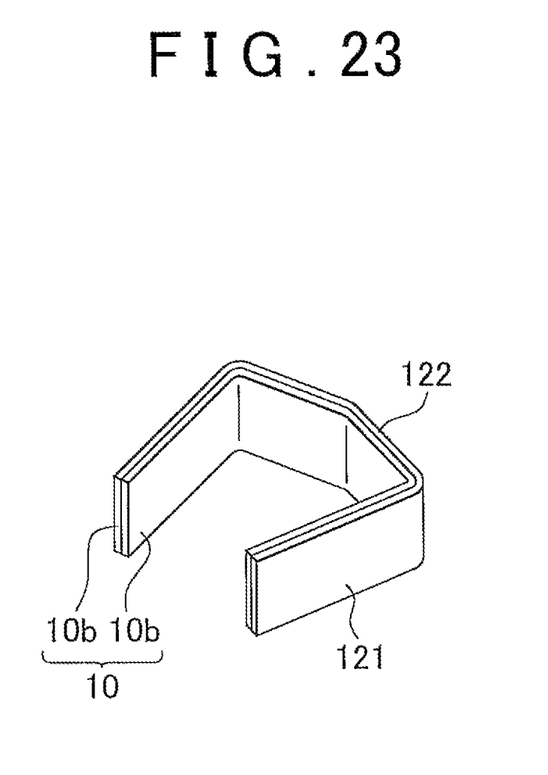
FIG. 23 is a perspective view of a magnetic member which is used in a variable reluctance resolver according to a ninth embodiment of the present invention.

FIG. 23 is a perspective view of a magnetic member which is used in a variable reluctance resolver according to a ninth embodiment of the present invention. As shown in FIG. 23, the magnetic member 10 according to the ninth embodiment of the present invention is formed by laminating a plurality of thin magnetic plates 10b in the thickness direction.

The thus configured magnetic member 10 can also suppress an eddy current loss. It should be considered that the embodiments disclosed herein are illustrative in all respects and not limiting. The scope of the present invention is intended to be defined not by the above description of the embodiments but by the claims, and to include all equivalents and modifications that fall within the scope of the claims.

The present invention may be used in the field of resolvers that measure rotation of a rotary electric machine.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A variable reluctance resolver comprising:
a rotor that rotates about a rotational axis;
a plurality of detection coils that detect rotation of the rotor; and
a plurality of magnetic members that magnetically connects adjacent ones of the coils to each other,
wherein each magnetic member includes a pair of body portions that extend in a radial direction of the rotor, each of the plurality of coils is wound around a pair of adjacent body portions of adjacent magnetic members, and a connection portion that connects the pair of body portions to each other on an outer side,
both the body portions and the connection portion have a thin flat shape, and
the body portions are flat so that a direction of extension of the flat shape is along a rotational axis direction, and each magnetic member has a U shape as viewed from the rotational axis direction.

2. The variable reluctance resolver according to claim 1, wherein distal ends of the pair of body portions are bent towards each other in a circumferential direction.

3. The variable reluctance resolver according to claim 1, wherein a length of the body portions in the rotational axis direction increases toward distal ends of the pair of body portions.

4. The variable reluctance resolver according to claim 1, wherein distal ends of the pair of body portions are curved to approach each other and to extend radially outward away from the rotor.

5. The variable reluctance resolver according to claim 1, wherein the magnetic member is formed by laminating a plurality of magnetic elements in the rotational axis direction.

6. The variable reluctance resolver according to claim 1, wherein the magnetic member is formed by laminating a plurality of magnetic elements in a direction that is orthogonal to the rotational axis direction.

7. The variable reluctance resolver according to claim 1, further comprising:
an outer magnetic element that is connected to the connection portion to extend on an outer circumferential side of the rotor,
wherein the outer magnetic element is provided with an engagement portion for attachment of the magnetic member to a support member.

8. The variable reluctance resolver according to claim 7, wherein the engagement portion is a mounting hole for attachment of the support member.

9. The variable reluctance resolver according to claim 7, wherein a plurality of the outer magnetic elements are provided to extend on the outer circumferential side of the rotor such that a plurality of the magnetic members are independent of each other.

10. A variable reluctance resolver comprising:
a rotor that rotates about a rotational axis;
a plurality of detection coils that detect rotation of the rotor; and
a plurality of U-shaped magnetic members that magnetically connects adjacent ones of the coils to each other,
wherein each magnetic member includes a pair of body portions, each of the plurality of coils is wound around a pair of adjacent body portion of adjacent magnetic members, a connection portion that connects first ends of the pair of body portions to each other, and distal end portions that are provided at second ends of the pair of body portions that are opposite the first ends to extend in a rotational axis direction,
the distal end portions, the body portions, and the connection portion have a wire shape, and
the magnetic member has a U shape as viewed from the rotational axis direction.

11. The variable reluctance resolver according to claim 1, wherein the magnetic member has a U-shaped cross-section in a direction perpendicular to the rotational axis direction.

12. A variable reluctance resolver comprising:
a rotor that rotates about a rotational axis;
a plurality of detection coils that detect rotation of the rotor; and
a magnetic member that magnetically connects adjacent ones of the coils to each other,
wherein the magnetic member includes a pair of body portions around which the coils are wound, and a connection portion that connects the pair of body portions to each other,
both the body portions and the connection portion have a thin flat shape, and
the body portions are flat so that a direction of extension of the flat shape is along a rotational axis direction, and the magnetic member has a U shape as viewed from the rotational axis direction,
wherein a length of the body portions in the rotational axis direction increases toward distal ends of the pair of body portions.

* * * * *